United States Patent [19]

Vandenbark et al.

[11] Patent Number: 5,240,286
[45] Date of Patent: Aug. 31, 1993

[54] AGRICULTURAL TANK WAGON

[75] Inventors: Gary A. Vandenbark, Shirley; Kenneth E. Weddle, Trafalgar, both of Ind.

[73] Assignee: Countrymark Cooperative, Inc., Indianapolis, Ind.

[21] Appl. No.: 845,623

[22] Filed: Mar. 4, 1992

[51] Int. Cl.$^5$ .............................................. B60P 3/22
[52] U.S. Cl. .................................... 280/839; 280/98; 280/476.1
[58] Field of Search ............... 280/838.9, 423.1, 400, 280/426, 442, 476.1, 81.6, 98, 408, 409

[56] References Cited

U.S. PATENT DOCUMENTS

| | | | |
|---|---|---|---|
| 2,126,819 | 8/1938 | Schawlem | 280/476.1 |
| 2,460,466 | 2/1949 | Nogle | 280/476.1 |
| 2,500,686 | 3/1950 | Jontz | 280/476.1 |
| 2,567,164 | 9/1951 | Brehany et al. | 280/839 |
| 2,699,341 | 1/1955 | Brettrager | 280/476.1 |
| 2,967,057 | 1/1961 | Meyer | 280/839 |
| 3,136,394 | 6/1964 | Woolslayer et al. | 280/423.1 X |
| 3,339,942 | 9/1967 | Ratkovich | 280/476.1 |
| 4,070,033 | 1/1978 | Weir et al. | 280/476.1 |
| 4,106,791 | 8/1978 | Greatbatch | 280/476.1 |

FOREIGN PATENT DOCUMENTS

| | | | |
|---|---|---|---|
| 2651082 | 5/1977 | Fed. Rep. of Germany | 280/476.1 |
| 0737287 | 5/1980 | U.S.S.R. | 280/476.1 |
| 2113635 | 8/1983 | United Kingdom | 280/442 |

OTHER PUBLICATIONS

DMI Auto-Steer Tank Wagon advertisement.

Primary Examiner—Robert J. Oberleitner
Assistant Examiner—Victor E. Johnson
Attorney, Agent, or Firm—Barnes & Thornburg

[57] ABSTRACT

An agricultural tank wagon is provided for attachment to a tow vehicle. The tank wagon comprises front running gear, rear running gear, a first coupling assembly pivotably coupling the rear running gear to the front running gear, a wagon tongue for attachment to the tow vehicle, and a second coupling assembly pivotably coupling the wagon tongue to the front running gear. The front running gear includes a front axle defining a central axis of rotation The rear running gear cooperates with the front running gear to support the tank. The first coupling assembly operates to pivot the rear running gear relative to the front axle about a first pivot axis that is offset from the central axis of rotation. The second coupling assembly operates to pivot the wagon tongue relative to the front axle about a second pivot axis lying in substantially parallel offset relationship with the central axis of rotation.

18 Claims, 3 Drawing Sheets

AGRICULTURAL TANK WAGON

BACKGROUND AND SUMMARY OF THE INVENTION

The present invention relates to a tank wagon for agricultural use. More particularly, the invention relates to a tank wagon, such as an anhydrous ammonia tank wagon, provided with a pivotable coupling assembly having a pivot axis that is offset from the front axle of the tank wagon.

Anhydrous ammonia is a standard liquid fertilizer typically applied by farmers prior to spring planting season or during the initial growth stage of the crop. Anhydrous ammonia is usually stored in bulk by dealers and transferred to 1,000 gallon or 1,450 gallon tanks which are secured to tank wagons for use by farmers. Farmers often participate in a rental program with dealers for seasonal use of the tank wagons.

In the usual arrangement, the farmer travels to the dealer's premises to pick up the fully-loaded tank wagon and uses his own pick-up truck or other vehicle to tow the tank wagon back to the farm. Thus, the tank wagon must be designed for safe operation at the road speeds set by law for operation of such vehicles.

Of course, upon reaching the farm, the tank wagon will be subjected to the rugged conditions typical of tillage operations. The tank wagon will normally be attached to an NH3/liquid applicator (for example, a pull-type swath applicator) and towed across the field to be fertilized. A farmer having considerable acreage to fertilize may need to make frequent trips between the farm and the dealer's premises to refill the tank.

Because tank wagons are typically distributed on a rental basis, they should be adaptable to accommodate varying row widths in the fields to be fertilized. Some farmers plant in 30 inch row spacings, while others prefer 36 or even 38 inch spacings. Where fertilizer is to be applied during the initial growth stage of the crop, tank wagon adaptability is required.

One problem frequently associated with some tank wagons is their tendency to roll over when turned sharply. It is recognized that conventional fifth wheel tank wagons may overturn if the front axle of the wagon is pivoted sharply relative to the load.

One attempt to solve this problem involves a design which abandons the fifth wheel arrangement entirely in favor of an automotive steering arrangement. See DMI® Form No. 1598A5 (DMI® Auto-Steer Tank Wagon). In the automotive steering arrangement, only the front wheels, not the front axle, pivot relative to the load when the tank wagon is turned.

Another longstanding problem with tank wagons is their tendency to sway or fishtail when pulled at normal road speeds with a pickup truck or other tow vehicle. Since the problem is more pronounced at higher speeds, the farmer may be forced to tow the wagon at less than normal road speeds set by law for operation of vehicles of this type. This may translate into a significant time loss for a farmer who must make frequent trips between the farm and the dealer's premises, and may also create traffic problems. The problem is also especially noticeable when the farmer tows both a first tank wagon and a second tank wagon hitched to the rear of the first tank wagon. It would thus be desirable to provide a tank wagon designed to minimize both the rollover and the swaying problems while providing ample load-bearing support and adaptability as required of such vehicles.

According to the present invention, an agricultural tank wagon is provided. The wagon is adapted for attachment to a tow vehicle such as a pickup truck or an agricultural implement. The tank wagon comprises front running gear, rear running gear, a first coupling assembly pivotably coupling the rear running gear to the front running gear, a wagon tongue for attachment to the tow vehicle, and a second coupling assembly pivotably coupling the wagon tongue to the front running gear. The front running gear includes a front axle defining a central axis of rotation. The rear running gear cooperates with the front running gear to support the tank. The first coupling assembly operates to pivot the rear running gear relative to the front axle about a first pivot axis that is offset from the central axis of rotation. The second coupling assembly operates to pivot the wagon tongue relative to the front axle about a second pivot axis lying in substantially parallel offset relationship with the central axis of rotation.

In accordance with one preferred aspect of the invention, the first coupling assembly includes a first plate affixed to the front axle. The first plate includes a first extended portion extending forward of the front axle and being formed to include a first opening aligned with the first pivot axis. The first coupling assembly further includes a second plate including a second extended portion extending forward of the front axle and being formed to include a second opening aligned with the first pivot axis. The first coupling assembly also includes a first pivot pin extending through the first and second openings along the first pivot axis to place the second plate in substantially overlapping pivoting relationship with the first plate.

In accordance with another preferred aspect of the invention, the wagon further includes a front tank-supporting bolster. A third coupling assembly pivotably couples the front tank-supporting bolster to the second plate at a location rearwardly offset from the first pivot axis. The third coupling assembly pivots the front tank-supporting bolster relative to the second plate about a third pivot axis transverse to the central axis of rotation.

In accordance with another preferred aspect of the invention, the second coupling assembly includes at least one pivot pin. The pivot pin is aligned along the second pivot axis and is positioned forward of the front axle and the first pivot axis.

Further in accordance with the present invention, an agricultural tank wagon adapted for attachment to a tow vehicle comprises first means for supporting a tank, second means for supporting the tank, first means for pivotably coupling the second supporting means to the first supporting means, a wagon tongue for attachment to the tow vehicle, and second means for pivotably coupling the wagon tongue to the front axle. The first supporting means includes a front axle defining an axis of rotation. The first coupling means operates to pivot the second supporting means about a first pivot axis that is offset from the axis of rotation of the front axle. The second coupling means operates to pivot the wagon tongue relative to the front axle about a second pivot axis lying in substantial parallel offset relationship to the axis of rotation of the front axle.

Further in accordance with the present invention, an agricultural tank wagon adapted for attachment to a tow vehicle comprises first means for supporting a tank, second means for supporting a tank, and means for pivotably coupling the second supporting means to the first supporting means.

The second supporting means includes a pole having a forward end and a rearward end. A rear axle is attached to the pole at the rearward end.

The coupling means includes a first plate affixed to the front axle, the first plate having an extended portion extending forward of the front axle and being formed to include a first opening. The coupling means also includes a second plate attached to the pole at the forward end. The second plate includes a second extended portion formed to include a second opening. The coupling means further includes a pivot pin extending through the second opening and the first opening to place the second plate in substantially overlapping pivoting relationship. The pivot pin also defines a first pivot axis that is forwardly offset from the axis of rotation of the front axle so that the pivot pin is isolated from compressive loading forces applied by the tank.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description refers particularly to the accompanying figures in which.

DETAILED DESCRIPTION OF THE DRAWINGS

Figure 1:
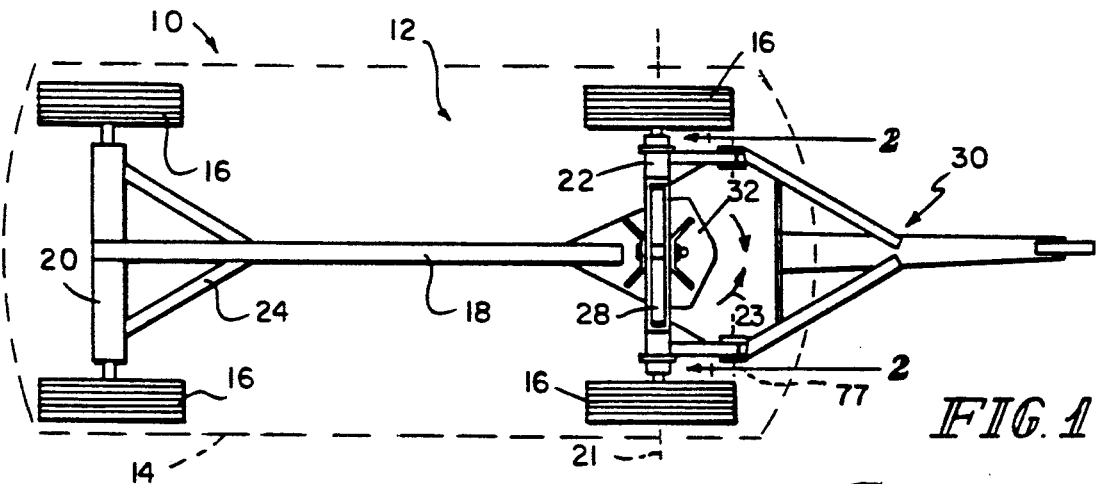
FIG. 1 is a top plan view of a tank wagon in accordance with the present invention with the tank shown in dotted lines for clarity.

An agricultural tank wagon 10 adapted for attachment to a tow vehicle in accordance with the present invention is illustrated in the accompanying drawing figures. As shown in FIG. 1, a tank wagon 10 includes an undercarriage 12 supported by four wheels 16 and adapted to support a tank 14 (shown in dotted lines). Undercarriage 12 is attached to the tow vehicle by way of a wagon tongue 30.

Tank 14 is preferably a standard tank for agriculture use, typically containing anhydrous ammonia. Such tanks are generally manufactured in either 1,000 gallon or 1,450 gallon sizes. Undercarriage 12 is capable of supporting anhydrous ammonia tanks of either size. Although tank 14 is removably mounted to undercarriage 12, it is contemplated that during normal use, tank 14 will remain mounted at all times to undercarriage 12.

For purposes of understanding the present invention, undercarriage 12 may be thought of as including front running gear providing first means for supporting tank 14 and rear running gear providing second means for supporting tank 14. "Front" and "forward" as used in connection with the description of this invention refer to the direction toward the tow vehicle (for example, the direction toward wagon tongue 30), while "rear" and "rearward" refer to the direction opposite the tow vehicle and hence away from wagon tongue 30. The front running gear includes a front axle 22 and associated structure as described more particularly below, and the rear running gear includes a pole 18, a rear axle 20, and associated structure as likewise detailed below.

The front running gear includes front axle 22 defining a central axis of rotation 21. The front running gear is pivotable relative to the rear running gear about a first vertical pivot axis 62 (shown, for example, in FIGS. 2 and 3) as indicated by arrow 23. A front tank-bearing bolster or support 28 is positioned over front axle 22 in alignment with central axis of rotation 21 to support tank 14 at a front region thereof. As described in more detail below, front support 28 cooperates with the front running gear to provide first means for supporting tank 14.

The rear running gear includes rear axle 20, longitudinally extending pole 18, a yoke 24, and a rear tank-bearing support 26. Yoke 24 extends between rear axle 20 and pole 18 to place rear axle 20 in affixed, non-pivoting relationship to pole 18. Optionally, the rear running gear may also include a standard hitch (not shown) welded to rear axle 20 to enable a second tank wagon to be hitched to rear axle 20.

Rear tank-bearing support 26 (shown, for example, in FIG. 2) is rigidly affixed to rear axle 20 to support tank 14 at a rearward region thereof. Support 26, rear axle 20, yoke 24, and pole 18 cooperate to define second means for supporting tank 14. Supports 26 and 28 cooperate to distribute the weight of tank 14 substantially evenly across both the front and rear running gear—that is, all of undercarriage 12.

A wagon tongue 30 is pivotably coupled to front axle 22 to pivot relative to front axle 22 about a second pivot axis 77 lying in substantially parallel, offset relationship with central axis of rotation 21. Tongue 30 is adapted to be attached to a tow vehicle, which may be a pickup truck or other road vehicle, for transporting wagon 10 to a farm field. Tongue 30 is of course also adapted for attachment to an off-road tow vehicle for operation in the field to be fertilized. This tow vehicle is typically a tractor or the like. Often, tongue 30 is attached to an implement such as a swath applicator which in turn is towed by a tractor. As noted, tongue 30 might also be attached to a hitch mounted on the rear axle of another tank wagon which is itself hitched to a tow vehicle.

Figure 2:
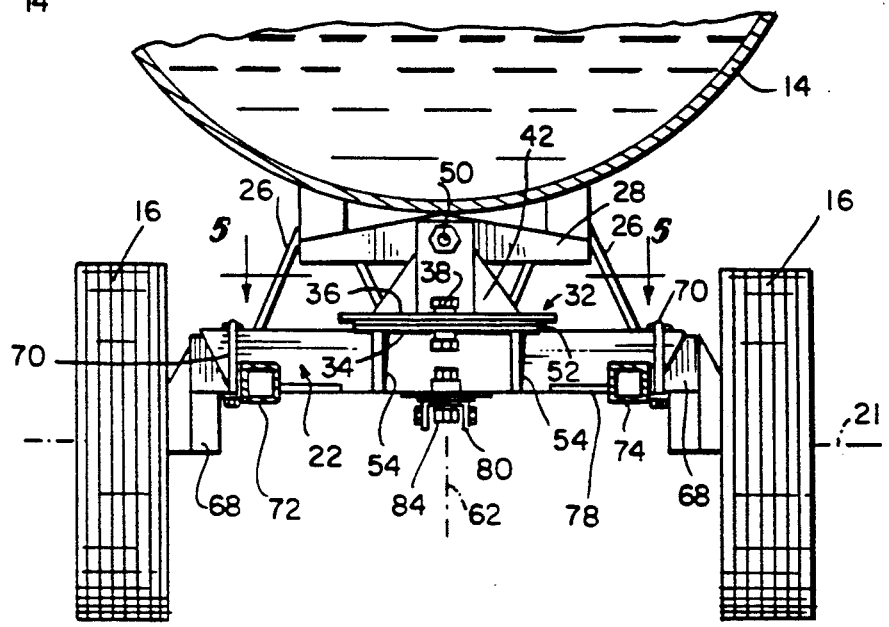
FIG. 2 is an enlarged front sectional view of the tank wagon of FIG. 1 taken along lines 2—2 with the wagon tongue removed to more clearly show a first coupling assembly coupling the front and rear running gear.

Tank wagon 10 further includes a first coupling assembly 32 providing means for coupling the rear running gear to the front running gear. As shown in FIG. 2 and described more particularly below, first coupling assembly 32 is generally a fifth wheel arrangement including a first plate 34 affixed to front axle 22, an upper plate 36 affixed to pole 18 of the rear running gear, and a pivot pin 38 pivotably coupling plates 34 and 36 to pivot front axle 22 relative to the rear running gear about first pivot axis 62 (shown in FIG. 3).

First pivot axis 62 is offset from central axis of rotation 21 to pivot the rear running gear relative to front axle 22. As used herein, axes that are "offset" are those lying in spaced-apart, non-intersecting relationship.

Figure 3:
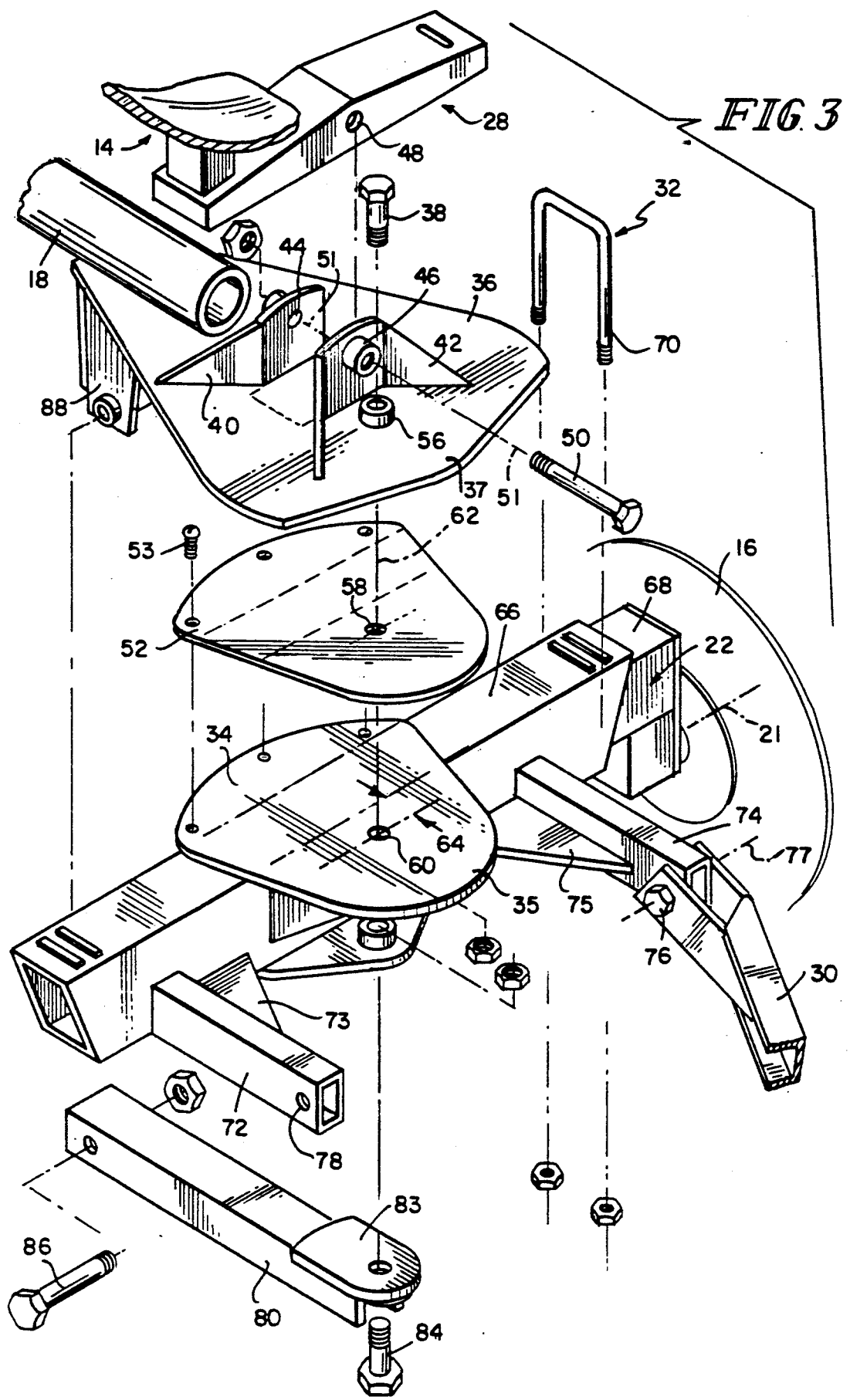
FIG. 3 is an exploded perspective view of a first coupling assembly in accordance with the present invention.

The detailed construction of first plate 34 and second plate 36 is shown in FIG. 3. As shown, second plate 36 is an elongated plate which is narrow at its rearward end (where pole 18 attaches), but generally diverges in the forward direction. Second plate 36 includes a second extended portion 37 defined as that portion of plate 36 extending forward of front axle 22.

Figure 4:
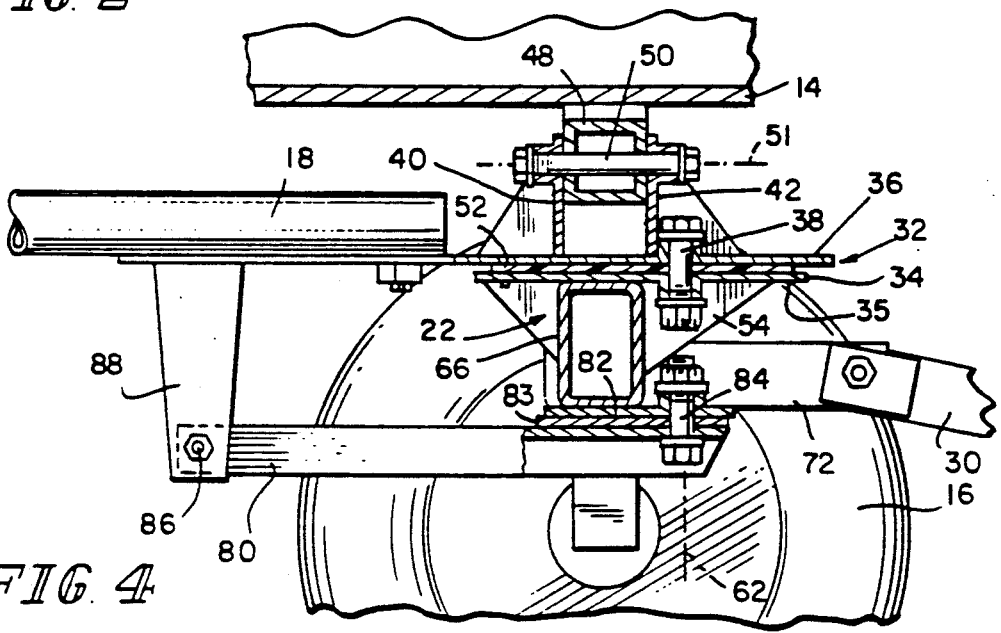
FIG. 4 is a partial sectional side view of a first coupling assembly in accordance with the present invention.

A pair of upstanding flanges 40, 42 project from the upper surface of second plate 36 to form a holder for front tank-bearing support bolster 28. In particular, flanges 40, 42 are both formed to include openings 44, 46 to align with an opening 48 formed in support bolster 28 when bolster 28 is assembled to plate 36. A bolt 50 or other fastener passes through openings 44, 46, 48 and cooperates with flanges to serve as a third coupling assembly pivotably coupling bolster 28 to flanges 40, 42 as shown, for example, in FIG. 4, at a location rearwardly offset from first pivot axis 62. Bolster 28 is thus capable of slight pivoting movement relative to second plate 36 about a third pivot axis 51. Third pivot axis 51 lies transverse to central axis of rotation 21 as shown in FIG. 3.

Because tank wagon 10 will be used on rough, uneven terrain, the load of liquid in tank 14 is likely to resultant stresses. Thus, by allowing bolster 28 to pivot slightly about pivot axis 51 in response to shifting of the load in tank 14, bolster 28 can absorb some of the stresses that would otherwise be transmitted to other portions of undercarriage 12.

As noted, second plate 36 lies in engaging pivotable relationship with first plate 34, so lubrication must be provided between the plates. The plates may simply be greased and a grease zerk provided in upper plate 36 for regular maintenance, or lubrication may be provided by other known means.

Alternatively, a sheet of plastic lubricant 52 such as UHMW (ultra-high molecular weight) plastic may be placed between plates 34 and 36. Preferably, sheet 52 is cut to substantially overlap with first plate 34. Sheet 52 may be bolted to first plate 34 by means of plow bolts 53 or by other art-recognized means.

Figure 6:
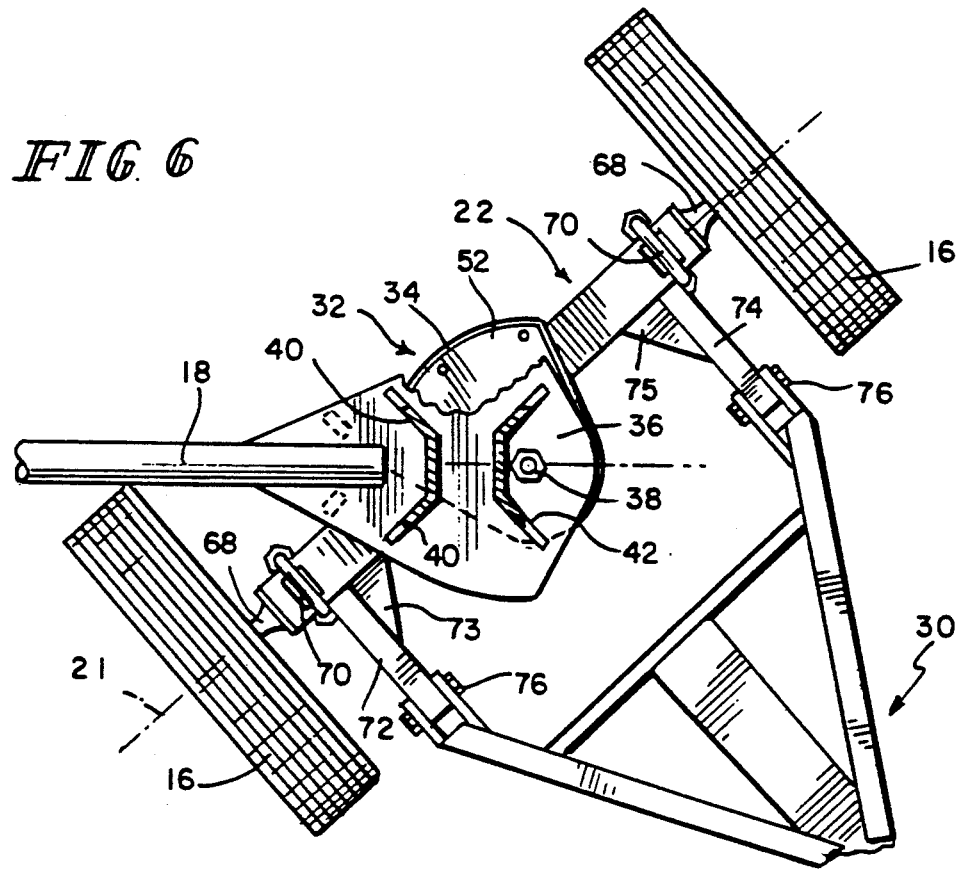
FIG. 6 is a view similar to that of FIG. 5 showing the first coupling assembly in a pivoted position.

As shown, first plate 34 is welded directly to front axle 22. Support flanges 54 may be provided. First plate 34 is preferably shaped so as to converge in the forward direction, and is preferably sized relative to second plate 36 so that plates 34 and 36 remain in substantially overlapping relationship even when second plate 36 is pivoted a maximum amount relative to first plate 34 about first pivot axis 62 as shown in FIG. 6. First plate 34 includes a first extended portion 35 defined as that portion of plate 34 extending forward of front axle 22.

Pivot pin 38 lies along first pivot axis 62 and couples second plate 36 to first plate 34. Second plate 36, plastic sheet 52, and first plate 34 each are formed to include openings 56, 58, 60 which align along first pivot axis 62 when properly assembled. Opening 56 is formed on second extended portion 37 of plate 36, while opening 60 is formed on first extended portion 35 of plate 34. Pivot pin 38 extends through holes 56, 58, and 60 to pivotably couple plate 36 to plate 34. Pivot pin 38 is bolted in place from the top (as shown, for example, in FIG. 3) or from the bottom.

As shown, first pivot axis 62 is offset from central longitudinal axis 21. First pivot axis 62 lies a predetermined distance 64 forward of both front axle 22 and front support bolster 28, such that axis 62 lies forward of the load-bearing portion of undercarriage 12. In other words, there is no compression load on pivot pin 38 along first pivot axis 62, although pin 38 is, of course, subjected to shear stresses arising from the pulling force provided by the tow vehicle. It is thought that the offset position of axis 62 (and the resultant absence of axial compression force on pin 38) advantageously assists in providing wagon 10 with antiswaying, self-centering properties.

Although predetermined distance 64 may vary, a distance of about four (4) inches has been found to be effective in accordance with the present invention for assisting in preventing both swaying and rollover. Shorter distances may not be effective to achieve acceptable wagon stability during both non-turning and turning forward movement, while longer distances may result in the need for plates 36 and 34 to be excessively large.

Front axle 22 is also shown in detail in FIG. 3. Front axle 22 includes a sleeve 66 adapted to receive extension members 68 at either end. U-bolts 70 or other suitable attachment means are provided to secure extension member 68 to sleeve 66. By loosening U-bolts 70 and sliding extension members 68 outwardly relative to sleeve 66, the length of front axle 22 can be changed. This feature is also provided on rear axle 20 so that the lengths of front axle 22 and rear axle 20 can be adjusted to accommodate varying widths of rows in a planted field, allowing tank wagon 10 to be used for operations on crops in their initial growth stages.

Front axle 22 is also provided with forwardly extending bars 72, 74 braced by respective braces 73, 75. The ends of tongue 30 are pivotably coupled to respective bars 72, 74 by way of a second coupling assembly including bolts 76 which extend through openings 78. Due to the pivotable coupling between bars 72, 74 and tongue 30, none of the load of tank 14 is borne by tongue 30. This is advantageous because tongue 30 will typically be manually attached and detached from the pickup truck or other on-road tow vehicle and attached to the off-road agricultural implement by one person.

The illustrated embodiment of the invention also includes a stabilizer bar 80 extending between second plate 36 and front axle 22 to stabilize front axle 22 against excessive torque transmitted from the tow vehicle through wagon tongue 30. Bar 80 has a front end pivotably coupled to a plate 82 which in turn is affixed to front axle 22. A plate 83 is provided on bar 80 to pivotably engage a portion of the underside of plate 82. Suitable lubrication should be provided between plate 83 and the underside of plate 82.

A bolt 84 or other suitable pivot pin cooperates with plates 82, 83 to provide a fourth coupling assembly pivotably coupling bar 80 to front axle 22. Particularly, bolt 84 couples plate 83 to plate 82 for pivoting motion. Bolt 84 also defines a fourth pivot axis aligned along vertical pivot axis 62 as shown, for example, in FIG. 4. Bar 80 also has a rear portion which is bolted by way of a bolt 86 to an extension 88 of upper plate 36.

Figure 5:
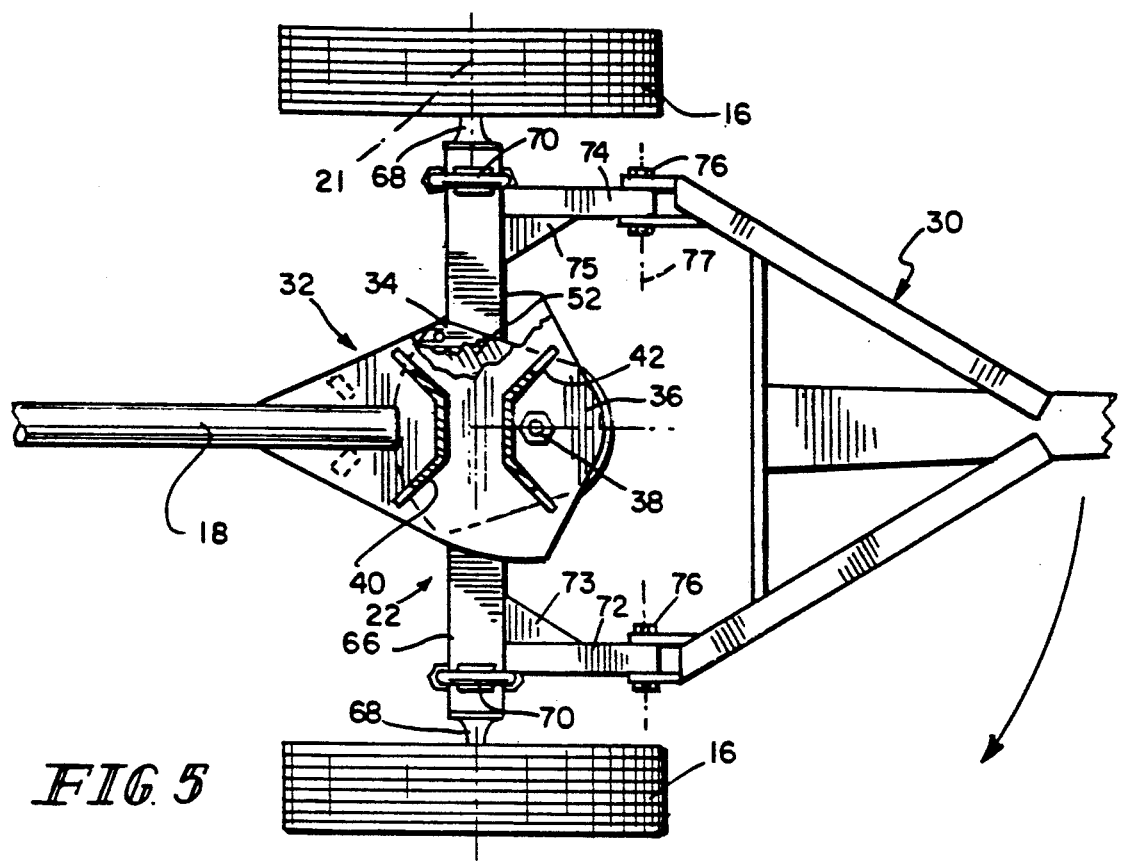
FIG. 5 is an enlarged top sectional view of the tank wagon of FIG. 2 taken along lines 5—5 with portions cut away showing a first coupling assembly in accordance with the present invention positioned for non-pivoting forward movement.

The assembled coupling assembly 32 is shown in FIG. 5 positioned for operation during non-turning forward movement of the tow vehicle. Lateral swaying motion caused by the pivoting of front axle 22 about first pivot axis 62 as defined by pin 38 is thought to be prevented or minimized by the illustrated coupling arrangement in which pin 38 is offset forward of front axle 22 so that pin 38 is isolated from axial compression forces along pivot axis 2.

In FIG. 6, axle 22 is shown pivoted to its full extent about first pivot axis 62 for turning movement of wagon 10. Plate 36 and plate 34 remain in substantially overlapping position in this configuration. It is thought that the risk of rollover of wagon 10 will be minimized by use of the illustrated arrangement.

Although the invention has been described in detail with reference to certain preferred embodiments, variations and modifications exist within the scope and spirit of the invention as described and defined in the following claims.

We claim:

1. An agricultural tank wagon adapted for attachment to a tow vehicle, the wagon comprising
   front running gear including a front axle defining a horizontal axis of rotation,
   rear running gear connected to the front running gear to support a tank,
   a first coupling assembly pivotably coupling the rear running gear to the front axle so that the rear running gear pivots relative to the front axle about a first vertical pivot axis, the first coupling assembly including a first plate affixed to the front axle, a second plate affixed to the rear running gear in substantially overlapping relationship with the first plate, and a first pivot coupling the first plate to the second plate, the first pivot pin being forwardly offset from the horizontal axis of rotation to define the first vertical pivot axis,
   a wagon tongue for attachment to the tow vehicle, and
   a second coupling assembly pivotably coupling the wagon tongue to the front axle to pivot the wagon tongue relative to the front axle about a second pivot axis lying in substantially parallel offset relationship with the horizontal axis of rotation.

2. The wagon of claim 1, wherein the first plate includes a first extended portion extending forward of the front axle and being formed to include a first opening aligned with the first vertical pivot axis.

3. The wagon of claim 2, wherein the second plate includes a second extended portion extending forward of the front axle and being formed to include a second opening aligned with the first vertical pivot axis, and the first pivot pin extends through the first and second openings along the first pivot axis.

4. The wagon of claim 1, wherein the rear running gear includes a pole having a forward end and a rearward end and a rear axle attached to the pole at the rearward end, and the second plate is attached to the pole at the forward end, the second plate including a second extended portion extending forward of the front axle and being formed to include a second opening aligned with the first vertical pivot axis.

5. The wagon of claim 4, wherein the first plate includes a first extended portion extending forward of the front axle and being formed to include a first opening, and the first pivot pin extends through the first and second openings along the first vertical pivot axis.

6. The wagon of claim 1, further including a front tank-supporting bolster and a third coupling assembly pivotably coupling the front tank-supporting bolster to the second plate at a location rearwardly offset from the first vertical pivot axis to pivot the front tank-supporting bolster relative to the second plate about a third pivot transverse to the horizontal axis of rotation.

7. The wagon of claim 1, wherein the rear running gear further includes a stabilizer bar having a rearward end attached to the second plate and the wagon further includes a fourth coupling assembly pivotably coupling the stabilizer bar to the front axle to pivot the stabilizer bar relative to the front axle about a fourth vertical pivot axis aligned with the first vertical pivot axis.

8. An agricultural tank wagon adapted for attachment to a tow vehicle, the wagon comprising
   first means for supporting means including a front axle defining a horizontal axis of rotation,
   second means for supporting the tank,
   first means for pivotably coupling the second supporting means to the first supporting means so that the second supporting means pivots about a first vertical pivot axis, the first coupling means including a first plate affixed to the front axle, a second plate affixed to the second supporting means in substantially overlapping relationship with the first plate, and a first pivotably coupling the first plate to the second plate, the first pivot pin being forwardly offset from the front axle to define the first vertical pivot axis,
   a wagon tongue for attachment to the tow vehicle, and
   second means for pivotably coupling the wagon tongue to the front axle to pivot the wagon tongue relative to the front axle about a second pivot axis lying in substantially parallel offset relationship to the horizontal axis of rotation.

9. The wagon of claim 8, wherein the first plate includes a first extended portion extending forward of the front axle and being formed to include a first opening aligned with the first vertical pivot axis.

10. The wagon of claim 9, wherein the second plate includes a second extended portion extending forward of the front axle and being formed to include a second opening aligned with the first vertical pivot axis, and a first pivot pin extending through the first and second openings along the first pivot axis.

11. The wagon of claim 8, wherein the second supporting means includes a pole having a forward end and a rearward end and a rear axle attached to the pole at the rearward end, and the second plate is attached to the pole at the forward end, the second plate including a second extended portion extending forward of the front axle and being formed to include a second opening aligned with the first vertical pivot axis.

12. The wagon of claim 11, wherein the first plate includes a first extended portion extending forward of the front axle and being formed to include a first opening, and the first pivot pin extends through the first and second openings along the first vertical pivot axis.

13. The wagon of claim 11, wherein the first supporting means includes a tank-supporting bolster and third means for pivotably coupling the tank-supporting bolster to the second plate at a location rearwardly offset from the first vertical pivot axis to pivot the tank-supporting bolster relative to the second plate about a third pivot axis transverse to the horizontal axis of rotation.

14. The wagon of claim 8, wherein the second supporting means further includes a stabilizer bar having a rearward end attached to the second plate and the wage further includes fourth means for pivotably coupling the stabilizer bar to the front axle to pivot the stabilizer bar relative to the front axle about a fourth vertical pivot axis aligned with the first vertical pivot axis.

15. An agricultural tank wagon adapted for attachment to a tow vehicle, the wagon comprising first means for supporting a tank, the first supporting means including a front axle defining an axis of rotation, second means for supporting the tank, the second supporting means including a pole having a forward end and a rearward end and a rear axle attached to the pole at the rearward end, and means for pivotably coupling the second supporting means to the first supporting means, the coupling means including a first plate affixed to the front axle, the first having a first extended portion extending forward of the front axle and being formed to include a first opening, a second plate attached to the pole at the forward end, the second plate including a second extended portion formed to include a second opening, and a pivot pin extending through the second opening and the first opening to place the second plate in substantially overlapping pivoting relationship and to define a first vertical pivot axis that is forwardly offset from the axis of rotation of the front axle so that the pivot pin is isolated from compressive loading forces applied by the tank.

16. The wagon of claim 15, further comprising a wagon tongue for attachment to a tow vehicle and second means for pivotably coupling the wagon tongue to the front axle to pivot the wagon tongue relative to the front axle about a second pivot axis lying in substantially parallel offset relationship with the axis of rotation of the front axle.

17. The wagon of claim 16, wherein the second coupling means includes a pair of pivot aligned along the second pivot axis and positioned forward of the first vertical axis.

18. The wagon of claim 15, wherein the first supporting means includes a tank-supporting bolster and third means for pivotably coupling the tank-supporting bolster to the second plate at a location rearwardly offset from the first vertical pivot axis to pivot the tank-supporting bolster relative to the second plate about a third pivot axis transverse to the axis of rotation.

* * * * *